US008669487B2

(12) United States Patent
Mangols et al.

(10) Patent No.: US 8,669,487 B2
(45) Date of Patent: Mar. 11, 2014

(54) DEVICE FOR THE LASER TRANSMISSION WELDING OF COMPONENTS OVER A RING-SHAPED CONTACT ZONE

(75) Inventors: Thomas Mangols, Erfurt (DE); Michael Krug, Jena (DE)

(73) Assignee: Jenoptik Automatisierungstechnik GmbH, Jena (DE)

( * ) Notice: Subject to any disclaimer, the term of this patent is extended or adjusted under 35 U.S.C. 154(b) by 690 days.

(21) Appl. No.: 12/911,768

(22) Filed: Oct. 26, 2010

(65) Prior Publication Data
US 2011/0100963 A1 May 5, 2011

(30) Foreign Application Priority Data
Oct. 30, 2009 (DE) .......................... 10 2009 051 672

(51) Int. Cl.
*B23K 26/00* (2006.01)
*B23K 26/08* (2006.01)
*B23K 26/24* (2006.01)

(52) U.S. Cl.
CPC ......... *B23K 26/0807* (2013.01); *B23K 26/0884* (2013.01); *B23K 26/246* (2013.01)
USPC ............. 219/121.63; 219/121.72; 219/121.73

(58) Field of Classification Search
USPC ............... 219/121.6, 121.63, 121.64, 121.73, 219/121.74, 121.76, 121.77, 121.81, 219/121.84, 121.85; 264/1.7, 1.1, 1.9, 248, 264/249, 492, 493; 156/272.2, 272.8, 156/273.3, 275.1, 275.7, 378, 379.6, 379.8; 425/174.4
See application file for complete search history.

(56) References Cited

U.S. PATENT DOCUMENTS

| | | | |
|---|---|---|---|
| 4,617,446 A * | 10/1986 | Anderson | 219/121.63 |
| 5,049,720 A | 9/1991 | Fang et al. | |
| 6,054,072 A | 4/2000 | Bentley et al. | |
| 7,287,877 B2 * | 10/2007 | Yasuda et al. | 362/267 |
| 2003/0196750 A1 * | 10/2003 | Sakai et al. | 156/272.8 |
| 2004/0154737 A1 | 8/2004 | Chen et al. | |
| 2005/0167407 A1 * | 8/2005 | Chen et al. | 219/121.64 |
| 2005/0225991 A1 * | 10/2005 | Yamazaki et al. | 362/362 |
| 2006/0096957 A1 | 5/2006 | Pfiz | |
| 2006/0134994 A1 * | 6/2006 | Yasuda et al. | 439/676 |
| 2007/0084552 A1 * | 4/2007 | Watanabe et al. | 156/272.8 |
| 2010/0140232 A1 | 6/2010 | Brunnecker et al. | |

FOREIGN PATENT DOCUMENTS

| | | |
|---|---|---|
| DE | 199 44 745 A1 | 7/2000 |
| DE | 10 2004 015 250 A1 | 10/2005 |
| DE | 10 2007 042 739 A1 | 10/2008 |
| EP | 0 472 850 A2 | 3/1992 |
| EP | 1 405 713 B1 | 4/2004 |
| EP | 1 518 664 A1 | 3/2005 |

* cited by examiner

*Primary Examiner* — Tu B Hoang
*Assistant Examiner* — Thien S Tran
(74) *Attorney, Agent, or Firm* — Leydig, Voit & Mayer, Ltd.

(57) ABSTRACT

A device for joining by a laser beam two components along a ring-shaped contact zone, where a first of the two components is transmissive for the laser beam and a second of the two components is absorptive for the laser beam. The device includes a receptacle configured to affix the absorptive component and an internal clamping chuck configured for placement on the transmissive component within an open inside area of the contact zone. The device also includes a pressure element with an open inside area that is larger than an extension of the contact zone, a laser source configured to emit the laser beam, and a rotatable holding wheel. The pressure element is connected to the internal clamping chuck via an external axial bearing, the holding wheel and an internal axial bearing so as to transmit to the internal clamping chuck contact pressure exerted on the pressure element.

13 Claims, 2 Drawing Sheets

DEVICE FOR THE LASER TRANSMISSION WELDING OF COMPONENTS OVER A RING-SHAPED CONTACT ZONE

CROSS REFERENCE TO RELATED APPLICATIONS

This application claims priority to German Patent Application No. DE 10 2009 051 672.7, filed on Oct. 30, 2009, which is hereby incorporated by reference herein in its entirety.

FIELD

The invention relates to a device for contour, simultaneous or quasi-simultaneous welding of components using the principle of laser transmission welding.

BACKGROUND

Laser transmission welding is generically described in German patent application DE 10 2007 042 739 A1. This type of welding has proven to be very practical and efficient for joining components, especially those made of plastic. It is based on the targeted application of at least one laser beam onto a contact zone in which two components touch each other, whereby the component facing the laser beam is transmissive for the wavelength of the laser beam employed, while the other component absorbs this wavelength. The laser beam passes through the transmissive component, strikes the surface of the absorptive component and heats it up. At an appropriate exposure time and power of the laser beam, the surface of the absorptive component melts. Heat conduction likewise causes melting of the areas of the transmissive component that are adjacent to the contact zone, creating a weld joint.

In order to achieve high-quality and reproducible welds, it is important for the components that are to be joined to be in close contact with each other at a prescribed contact pressure, at least along the areas that are to be welded, referred to below as the contact zone. This ensures an effective heat conduction and promotes the dimensional stability of the welded product, which is achieved in that an increasing counter-pressure to the swelling melt is generated.

A problem encountered here has to do with the holding and pressing together of the components at the contact zone, without hindering the effect of the laser beam. A number of solutions have been described for building up an appropriate contact pressure.

German patent application DE 10 2004 015 250 A1 describes a device in which the workpieces (referred to below as components) are pressed against a clamping roller in the area of the welding procedure by means of a clamping finger. This clamping device can press the components together at individual points. Welding using a vertically impinging laser beam can then be carried out in the vicinity of the clamping finger and the clamping roller. The clamping finger that grazes over the surface of the one component, however, also entails the risk of damage.

In order to be able to apply clamping forces onto a contact zone as vertically as possible and, at the same time, in order not to block a laser beam that is directed at the contact zone, European patent application EP 1 405 713 B1 describes the selective use of a transparent ball or a transparent roller that is moved under pressure over the surface of the component (here the workpiece) made of the transmissive material, as a result of which the components below the placement point of the ball or roller are pressed against each other. The position of the workpieces that are to be joined can be fixed by creating punctual welds before the beginning of the actual joining procedure. The laser beam is passed through the ball, a process in which the ball or roller functions as a focusing lens.

The two above-mentioned solutions have in common the fact that a contact pressure is exerted along the contact zone so as to act only punctually upon said contact zone; that is to say, the contact pressure only acts directly at the place where the laser beam strikes. These devices are thus only suitable for contour welding in which the welding takes place with the a one-time pass of the laser beam over the contact zone.

Therefore, the use of efficient methods such as simultaneous welding or quasi-simultaneous welding in which the entire contact zone is welded simultaneously or quasi-simultaneously is not possible with those solutions. Simultaneous welding and quasi-simultaneous welding require contacting under the effect of contact pressures along the entire contact zone.

Moreover, in order to be able to weld a ring-shaped contact zone, if a laser scanner is used, it should be positioned above and advantageously in the center area of the ring-shaped contact zone. From such a position, the contact zone can be scanned especially effectively by the laser scanner.

Therefore, devices or their parts, which are likewise above the contact zone and are in contact with the components, can hinder the scanning procedure. Using transmissive materials such as, for example, glass plates as pressure elements, and transmitting the laser beam through them entails the risk that impurities will become burned into the transmissive materials.

If the contact zone extends to the edges of the components, it is difficult to use so-called external clamping devices, which apply a contact pressure from the edges of the components. Possible alternatives involve the use of suitable internal clamping devices.

German patent application DE 10 2007 042 739 A1 describes a clamping device for exerting a contact pressure on two components along a shared contact zone in order to join the two components employing the laser transmission welding method. The two components in question here are, on the one hand, a quadrangular open lower component and, on the other hand, a cover that is placed on top of the lower component and that closes flush with the outsides of the lower component. Together, the surfaces that touch each other form a contact zone, which here has a rectangular, flat, continuous ring-shaped form along which the two components are welded together.

A problem encountered with welding contact zones having a flat, continuous ring-shaped form using a laser beam includes the fact that the laser beam and the requisite contact pressure should act on the components from the same direction, while the mechanical means with which a contact pressure is transmitted to the components should not block the laser beam.

According to German patent application DE 10 2007 042 739 A1, the clamping device comprises a receptacle to support the lower component, an internal clamping chuck which, on the one hand, lies against the cover inside the contact zone and, on the other hand, is in contact with the contact zone in such a way that it projects over a clamping head (referred to below as a pressure element) whose open inside area is larger than the contact zone and from which a contact pressure acts on the cover via the internal clamping chuck.

In order for a laser beam coming from a laser welding head to be able to strike the cover along the contact zone, an encircling slot that has the shape and size of the contact zone and that is interrupted by connecting struts is incorporated into the internal clamping chuck.

A special shaping of the connecting struts should keep the blocking effect as small as possible in order to ensure that the weld is of a sufficiently good quality. In a special embodiment, the pressure elements can also be swiveled out of the path of the laser beam. However, such punctual alleviations of the load result in unequal clamping conditions over the contact zone. Fundamentally, a clamping device according to German patent application DE 10 2007 042 739 A1 would probably be equally suitable for use in contour welding, simultaneous welding and quasi-simultaneous welding.

There are limits to the reduction of the number and width of the connecting struts that block the laser beam, since these struts are instrumental for ensuring that the force transmission onto the cover is uniformly distributed and as complete as possible. The connecting struts and thus the entire internal pressure punch should be made of a material with a high bending stiffness.

Because the properties of a weld that is being created in the contact zone area below the connecting struts in which the direct effect of the laser beam is permanently blocked differ from those of the weld in the slot areas and, no truly homogeneous weld can be created along the contact zone.

SUMMARY

An aspect of an embodiment of the present invention is to provide a device for the laser transmission welding of components using a laser beam along a ring-shaped contact zone with which a defined contact pressure can be exerted onto the components without the laser beam being permanently blocked off.

In an embodiment, the present invention provides a device for joining, by a laser, two components along a ring-shaped contact zone jointly formed by the components, where a first of the two components is transmissive for the laser beam and a second of the two components is absorptive for the laser beam. The device includes a receptacle configured to affix the absorptive component and an internal clamping chuck with at least one contact surface configured for placement on the transmissive component within an open inside area of the contact zone. The device also includes a pressure element with an open inside area that is larger than an extension of the contact zone, a laser source configured to emit the laser beam, a beam guide unit, a beam guide control unit, an external axial bearing, a rotatable holding wheel, and an internal axial bearing. The pressure element is connected to the internal clamping chuck via the external axial bearing, the holding wheel and the internal axial bearing so as to transmit to the internal clamping chuck contact pressure exerted on the pressure element.

BRIEF DESCRIPTION OF THE DRAWINGS

Exemplary embodiments of the present invention are described in more detail below with reference to the drawings, in which.

DETAILED DESCRIPTION

Figure 1A:
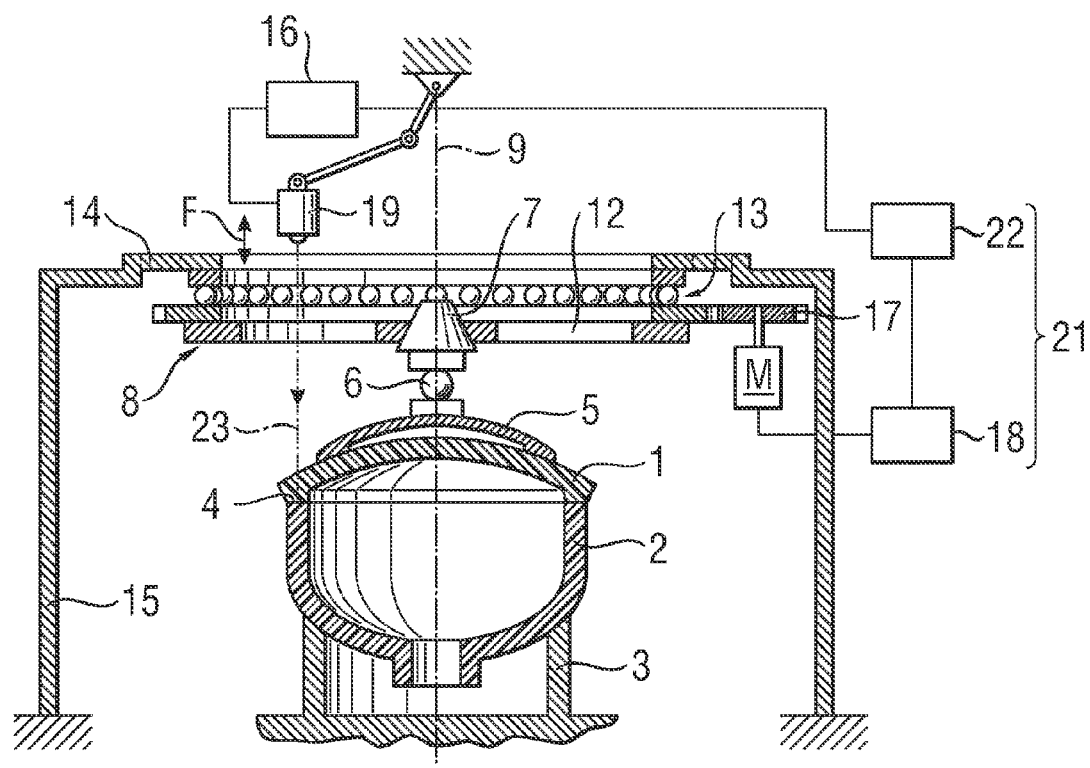
FIG. 1a shows side view of a schematic depiction of a device according to an embodiment of the invention including a robot-controlled laser welding head.

Below, the term ring-shaped contact zone is used to refer to any continuous ring-shaped area that completely surrounds an area and that consists of two concentrically arranged continuous lines of any shape. The ring-shaped area may be in one plane.

Below, reference is made to the welding of the components through the effect of a laser beam. However, the device can also be used for other joining methods such as adhesion, in which the laser beam merely contributes to the curing of the adhesive. The connection can also be produced by various methods of weld production such as contour, simultaneous or quasi-simultaneous welding by means of laser transmission welding.

In contour welding, the course of the contact zone, the contour, is traced by a laser beam and, in the process, progressively welded.

If the contour is exposed to and, at the same time, welded by the laser beam over its entire extension, this is referred to as simultaneous welding.

If a laser beam traces the contour several times within a very short period of time, a melt is produced almost simultaneously over the entire contour, which is known as quasi-simultaneous welding.

In an embodiment the invention provides a device for the laser transmission welding of two components along a ring-shaped contact zone jointly formed by said components, employing a laser beam, whereby one of the two components is transmissive for the laser beam while the other is absorptive, said device having a receptacle for affixing the absorptive component, an internal clamping chuck with at least one contact surface for placement on the transmissive component within the open inside area of the contact zone, a pressure element with an open inside area that is larger than the extension of the contact zone, a laser source that emits a laser beam, a beam guide unit and a beam guide control unit, in that the internal clamping chuck and the pressure element are connected indirectly via an internal axial bearing, a rotating holding wheel and an external axial bearing, as a result of which contact pressures being exerted onto the pressure element are transmitted to the internal clamping chuck.

Depending on the requirements in terms of the desired force application and the force flow and depending on the surface configuration of the transmissive component, the internal clamping chuck can be in contact with the entire surface or else only in partial areas within the open inside area of the contact zone on the surface of the transmissive component.

The achievable contact pressures may be determined by the spatial configuration of the components, especially in the area of the contact zone, as well as by their material properties such as, for example, elasticity and brittleness. The internal clamping chuck can be made of various materials such as, for instance, steel, plastic or composite materials that are suitable for the transmission of the requisite forces. It is also advantageous for the contact surface of the internal clamping chuck to be covered with a suitable material that prevents mechanical damage to the surface of the transmissive component, but without leaving any residues behind on the surface, for example, due to abrasion. The internal clamping chuck ends at such a distance from the contact zone that it is struck by the laser beam vertically from above as well as at an angle of more than 45°, but preferably more than 75°.

The shape and dimensions of the internal clamping chuck can be configured to be component-specific. The adaptation of the construction of the internal clamping chuck to the components ensures an optimum of force application and force flow in the components that are to be joined.

Advantageously, all of the other elements of the device can be configured as identical parts when the device is configured for geometrically different components. The components that are to be processed do not have to be rotation-symmetrical nor do they have to be rotated during the processing.

The internal axial bearing is located on the surface opposite from the contact surface of the internal clamping chuck. Along an axis of rotation that coincides with the surface normal of the contact surface, there is an element that joins the internal axial bearing to the holding wheel. Such an element can be a shaft. The internal axial bearing is preferably configured as a toe bearing.

The axis of rotation may run through the center area of the internal clamping chuck.

The internal axial bearing that is connected to the internal clamping chuck performs several functions. It holds the internal clamping chuck, it establishes a connection to the holding wheel and it uncouples its movements around the axis of rotation. Therefore, both of them can move around the axis of rotation independently of each other at different speeds, directions of rotation and/or angles of rotation. A force flow between the holding wheel and the internal clamping chuck remains possible here.

The internal axial bearing can be, for example, a rotatably mounted journal, arrangements of one or more balls, or else pneumatically, hydraulically or mechanically mounted components such as, for example, a toe bearing. In additional embodiment variants, the internal axial bearing can also be a partial structure of the holding wheel, especially a wheel hub.

The holding wheel may have a wheel hub, a wheel rim and wheel spokes that connect the wheel hub to the wheel rim. The wheel spokes can be offset with respect to each other by an identical angle.

The wheel spokes are made of a solid and yet tough material that provides a high dimensional stability while, at the same time, absorbing and transmitting bending stresses as well as acceleration and centrifugal forces. Moreover, the mechanical properties of the material may be hardly or not at all affected by the impinging laser radiation. Such materials can be, for example, steel or steel alloys.

The wheel rim is dimensioned in such a way that a laser beam that passes through the area surrounded by the wheel rim can reach all of the places of the contact zone. In a preferred embodiment, the wheel rim surrounds an area that, in a top view, is larger than the open inside area of the contact zone.

The surface of the wheel rim facing away from the components is connected to the external axial bearing. The surface of the axial bearing facing away from the components, in turn, is connected to the pressure element. The pressure element extends over areas of the wheel rim. In an embodiment of the invention, the pressure element is a U-shaped frame. It is held by a device and runs coaxially to the axis of rotation. Moreover, the device applies contact pressures onto the pressure element that are oriented parallel to the axis of rotation and that are transmitted to the internal clamping chuck via the external axial bearing, the holding wheel and the internal axial bearing. The external axial bearing may be configured as a roller bearing. In an embodiment, guiding forces are also transmitted by the external axial bearing and they serve to secure the holding wheel against tipping out of its axis of rotation, while nevertheless allowing a controllable movement along the axis of rotation.

The wheel rim is also connected to a drive which can rotate the holding wheel around the axis of rotation. It is an aspect of the invention that the holding wheel can rotate around the axis of rotation with a uniform, with a non-uniform, or with a discontinuous movement such as, for example, a step-wise movement. Moreover, the direction of rotation can be repeatedly changed.

The drive of the holding wheel, the deflection of the laser beam by the beam guide unit and the movement of the device that holds and guides the pressure element are regulated by control means, and they are coordinated with each other in such a way that processing, especially welding of the components, is made possible. This can be done by a central control unit or by individual control units that are associated with the elements and that communicate with each other.

The beam guide unit is connected to a laser source and can be, for example, a robot-controlled laser welding head or a laser scanner. It is located above the holding wheel and it directs a laser beam onto the components. In this process, the laser beam passes through the surface that lies in the plane of rotation of the holding wheel and that is delimited by the wheel rim.

When contour welding is performed, the holding wheel is moved around such an angle of rotation and at such a rotational speed that the laser beam does not strike any of the wheel spokes at any point in time. This procedure is also possible with quasi-simultaneous welding if the speeds or motions of the holding wheel can be such that they allow a constant, unblocked passage of the laser beam.

In order to compare the position of the wheel spokes to the position and movement of the laser beam, the holding wheel may be connected to a control unit that can determine the momentary position of the wheel spokes and can change it via a drive. This data, together with information about the spatial extension of the contact zone, the course of the laser beam as well as its momentary orientation, is stored in a suitable form, and these pieces of information are compared to each other for purposes of effectuating the control. The movements of the holding wheel and of the laser beam correspond to each other.

However, if the methods of simultaneous welding or quasi-simultaneous welding are used, it has proven to be advantageous for the holding wheel to continue to rotate freely at a prescribed rotational speed. The laser beam only strikes the wheel spokes for a negligibly short period of time. Consequently, an area of the contact zone located underneath the wheel spokes is only blocked for an extremely short period of time. For this application form, it is advantageous if the rotational speed of the holding wheel and the course of the scanning procedure do not correspond with respect to each other. A sufficiently large phase shift or a coincidental relationship of the two movements to each other ensures that the laser beam will only strike the wheel spokes for a very short time and particularly at constantly changing angular positions. This achieves that, on the average over time, all of the areas of the contact zone will be exposed to the laser beam uniformly, ensuring a homogenous weld formation.

When a device according to an embodiment of the present invention is used, components that are to be welded are positioned against each other in a receptacle and pressed against each other within the open inside area of the contact zone by the internal clamping chuck. The rotating holding wheel is loaded coaxially with a contact pressure in the direction of the components by the external axial bearing. The contact pressure is transmitted via the wheel spokes to the hub of the holding wheel and then further via the internal axial bearing and the internal clamping chucks to the components.

The course of the forces in the components depends on their geometry. Especially if the transmissive component has convex surfaces that bulge slightly outwards, the forces are directed towards the contact zone and both components are pressed together there. Planar or concave components are likewise suitable for use, although they should not bend appreciably when the contact pressure is applied.

Depending on the selected welding method, the control of the wheel rim is such that the laser beam is not interrupted by the wheel spokes at all or else only during very short periods of time and at constantly changing angular positions. The laser beam penetrates the transmissive component and strikes the contact zone where the two components are pressed against each other by the action of the device according to the invention. The laser radiation is converted into heat in the upper layers of the absorptive component, thereby melting them. Due to heat conduction, layers of the transmissive component are also melted. Once the application of energy has been terminated and the melt has hardened, both components have been joined to each other. The contact pressure ensures an equalization of any manufacturing tolerances that might have been present, thus yielding a secure join.

In an embodiment, according to FIG. 1a, a component 2 that is absorptive for the employed laser beam 23 is situated in a receptacle 3. A component 1 that is transmissive for the laser beam 23 is positioned on top of the absorptive component 2 in such a manner that the two components 1, 2 are in contact with each other along a continuous ring-shaped contact zone 4 that lies in a horizontal plane. Within the open inside area of the contact zone 4, a contact surface of an internal clamping chuck 5 rests on the upwards-facing surface of the transmissive component 1. On the surface opposite from the contact surface of the internal clamping chuck 5, there is an internal axial bearing 6 that is configured as a toe bearing. The internal axial bearing 6 is in communication with a shaft 7 that, in the embodiment, is configured as a cone-shaped hub of a holding wheel 8 in such a way that the axis of rotation 9 of the shaft 7 and the surface normal of the surface that is opposite from the contact surface of the internal clamping chuck 5 coincide. Here, the axis of rotation 9 is located vertically above the center area of the internal clamping chuck 5.

In another embodiment, the shaft 7 can also be configured cylindrically or with another cross section. Moreover, it does not necessarily have to be an integral part of the holding wheel 8, but rather, it can also be an autonomous element.

It is likewise within the scope of the invention if the planes in which the contact zone 4 or the wheel rim 12 lie are not parallel but rather at an angle with respect to each other.

An external axial bearing 13 lies on the surface of the wheel rim 12 facing away from the components 1, 2, and this external axial bearing 13 is connected via a U-shaped pressure element 14 to two columns 15 that hold the pressure element 14. The circumference of the wheel rim 12 is connected via a drive 17 to a drive control unit 18. A robot-controlled laser welding head 19 that serves as a beam guide unit is arranged above the holding wheel 8, said laser welding head 19 being connected to a beam guide control unit 22 and to a laser source 16. The laser beam 23 emitted by the robot-controlled laser welding head 19 is guided along the contact zone 4. The drive control unit 18 and the beam guide control unit 22 communicate with each other and together form the control unit 21.

Of course, in other embodiments of the invention, just one or else a plurality of beam guide units can be present, with which several laser beams 23 are guided over the contact zone 4 at the same time.

Figure 1B:
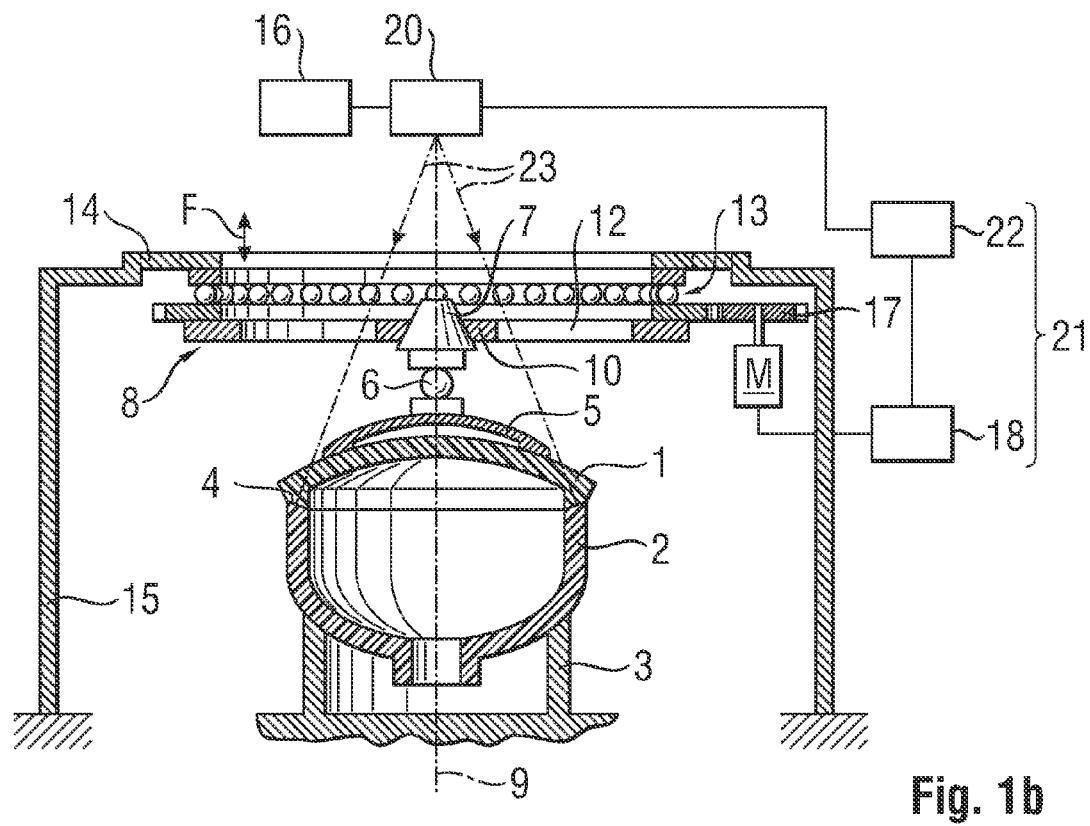
FIG. 1b shows a side view of a schematic depiction of a device according to another embodiment of the invention including a laser scanner.

In another embodiment, according to FIG. 1b, the beam guide unit is made up of a laser scanner 20 that is arranged on the axis of rotation 9. For the rest, this embodiment corresponds to the one depicted in FIG. 1a.

Figure 2:
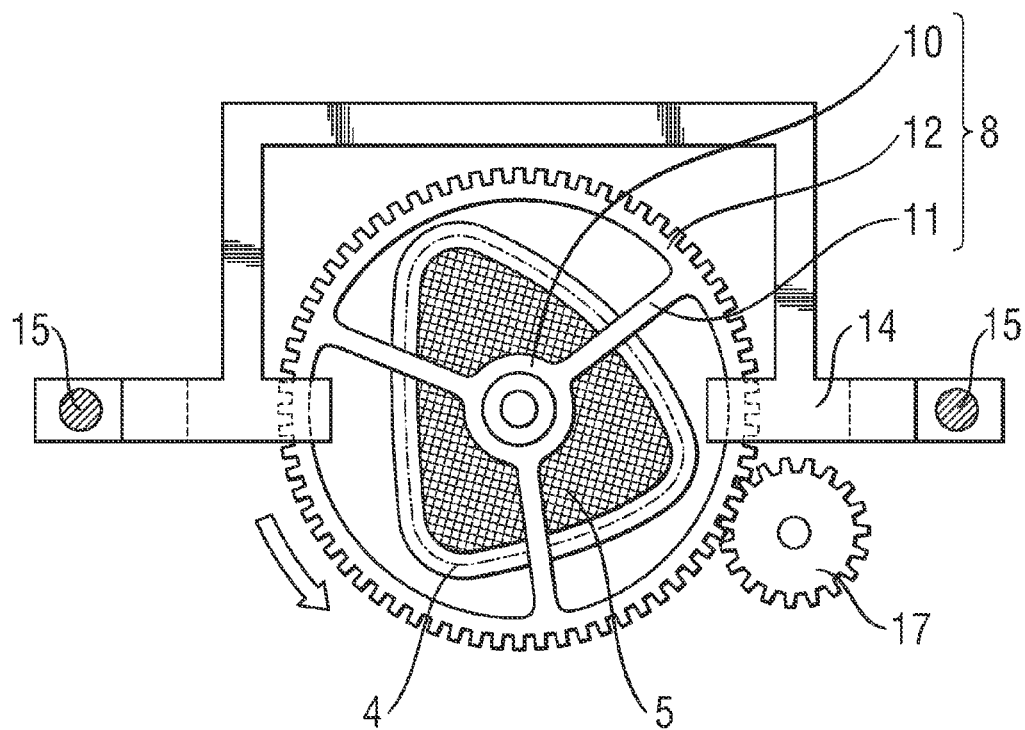
FIG. 2 shows a top view of a schematic depiction of a device according to an embodiment of the invention.

FIG. 2 shows a top view of a device according to the embodiments of FIGS. 1a and 1b. For the sake of greater clarity, the depiction here does not show the external axial bearing 13 nor does it show the beam guide unit, which is a robot-controlled laser welding head 19 in the first embodiment and a laser scanner 20 in the second embodiment.

The holding wheel 8 is formed by a wheel hub 10, three wheel spokes 11, which are each offset with respect to each other by an angle of 120°, and a wheel hub 12. The circumferential surface of the wheel hub 12, corresponding to a drive wheel belonging to the drive 17, is configured in such a way that the wheel hub 12 and the drive wheel are connected directly, e.g. via intermeshing teeth, or indirectly, e.g. via a V-belt, in order to transmit the rotational movement of the drive 17 to the holding wheel 8 with as little slippage as possible.

According to the two described embodiments, the pressure element 14 is configured as a U-shaped frame and is connected to the external axial bearing 13 (not shown in FIG. 2) at two places that are opposite from each other. The contact pressure can be exerted either only by the weight force of the pressure element 14 or else it is achieved by a tensioning between the pressure element 14 and the external axial bearing 13. The clamping force of the tensioning, and thus the contact pressure, can be adjusted in that the pressure element 14 is height-adjustably attached to the columns 15 which are in a fixed positional relationship with the receptacle 3.

Since, in a conventional arrangement of the laser scanner 20 according to FIG. 1b, the laser beam 23 emitted by this laser scanner 20 strikes the contact zone 4 at an angle <90°, the components 1, 2 can be configured in such a way that the contact zone 4 is positioned at such a slant that the laser beam 23 strikes the contact zone 4 approximately vertically. Moreover, with such a slanted position, the contact pressures that are directed towards the outside by the internal clamping chuck 5 are transmitted to the contact zone 4 virtually vertically.

The device can be used for the method of contour welding as well as for simultaneous and quasi-simultaneous welding. Via an internal clamping chuck 5 that has been adapted to the geometry and surface characteristics of the components 1, 2, high contact pressures can be applied to the components 1, 2 that are to be joined. As a result of the configuration of the device as an internal clamping device, in which the blocking of the laser beam 23 only takes place for a very short period of time and at constantly changing angular positions, the contact zone 4 that is to be welded is not permanently covered. This makes it possible to create homogeneous weld joints. All of the elements of the device consist of materials that do not wear out when exposed to laser radiation and, except for the internal clamping chuck 5 designed specifically for a type of components 1, 2, can be repeatedly used as equal parts. The beam path of the laser beam 23 is open of glass or other elements or materials whose properties could be negatively impacted by exposure to laser radiation. Furthermore, the device according to the invention allows the welding of non-rotation-symmetrical components 1, 2 that, moreover, do not have to be rotated during the welding procedure. The device can be used for the production of plastic parts made up of several components, for example, in the realm of automotive suppliers.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS 1 transmissive component
2 absorptive component
3 receptacle
4 contact zone
5 internal clamping chuck
6 internal axial bearing
7 shaft
8 holding wheel
9 axis of rotation
10 wheel hub
11 wheel spoke
12 wheel rim
13 external axial bearing
14 pressure element
15 column
16 laser source
17 drive
18 drive control unit
19 robot-controlled laser welding head
20 laser scanner
21 control unit
22 beam guide control unit
23 laser beam

What is claimed is:

1. A device for joining by a laser beam two components along a ring-shaped contact zone jointly formed by the components, a first of the two components being transmissive for the laser beam and a second of the two components being absorptive for the laser beam, the device comprising:
a receptacle configured to affix the absorptive component;
an internal clamping chuck having at least one contact surface configured for placement on the transmissive component within an open inside area of the contact zone;
a pressure element with an open inside area that is larger than an extension of the contact zone;
a laser source configured to emit the laser beam;
a beam guide unit connected to the laser source and configured to direct the laser beam toward the contact zone;
a beam guide control unit configured to control the beam guide unit;
an external axial bearing;
a rotatable holding wheel; and
an internal axial bearing,
wherein the pressure element is connected to the internal clamping chuck via the external axial bearing, the holding wheel and the internal axial bearing, so as to transmit to the internal clamping chuck contact pressure exerted on the pressure element,
wherein the holding wheel includes a wheel hub, a wheel rim, and a plurality of wheel spokes connecting the wheel hub to the wheel rim.

2. The device recited in claim 1, wherein the joining is a laser transmission welding of the two components.

3. The device recited in claim 1, wherein with respect to a top view, an open inside area of the wheel rim is larger than the open inside area of the contact zone, so that the wheel covers the contact zone only by wheel spokes thereof.

4. The device recited in claim 3, wherein the clamping chuck includes a second surface opposite the contact surface, and further comprising a shaft affixed to the wheel hub, the shaft being in contact with the second surface via the internal axial bearing such that an axis of rotation of the shaft coincides with a surface that is normal to the second surface.

5. The device recited in claim 4, wherein the axis of rotation runs through a center of the contact area of the internal clamping chuck.

6. The device recited in claim 5 further comprising a drive and a drive control unit, the drive being connected to the drive control unit and to a circumference of the wheel rim, wherein the wheel rim is connected to the pressure element via the external axial bearing.

7. The device recited in claim 6, wherein the drive control unit is connected to the beam guide control unit so as to coordinate movements of the laser beam and holding wheel with each other.

8. The device recited in claim 1, wherein the internal axial bearing is a toe bearing and the external axial bearing is a roller bearing.

9. The device recited in claim 1, wherein the pressure element includes a U-shaped frame that is held by a device running coaxially to an axis of rotation of the holding wheel.

10. The device recited in claim 4, wherein the pressure element includes a U-shaped frame that is held by a device running coaxially to the axis of rotation.

11. The device recited in claim 1, wherein the beam guide unit includes a robot-controlled laser welding head.

12. The device recited in claim 1, wherein the beam guide unit includes a laser scanner.

13. The device recited in claim 1, wherein the pressure element is configured to provide the contact pressure by a weight thereof.

* * * * *